Figure 4:
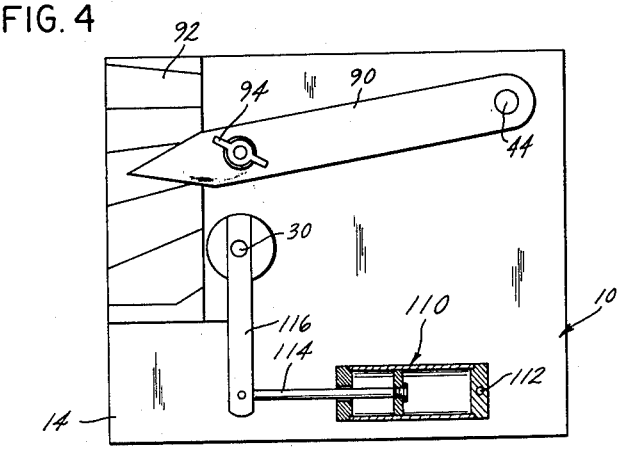

June 29, 1965  A. S. EDWARDS ETAL  3,191,615
AUTOMATIC FLUID CONTROLLER
Filed June 9, 1961  2 Sheets-Sheet 1
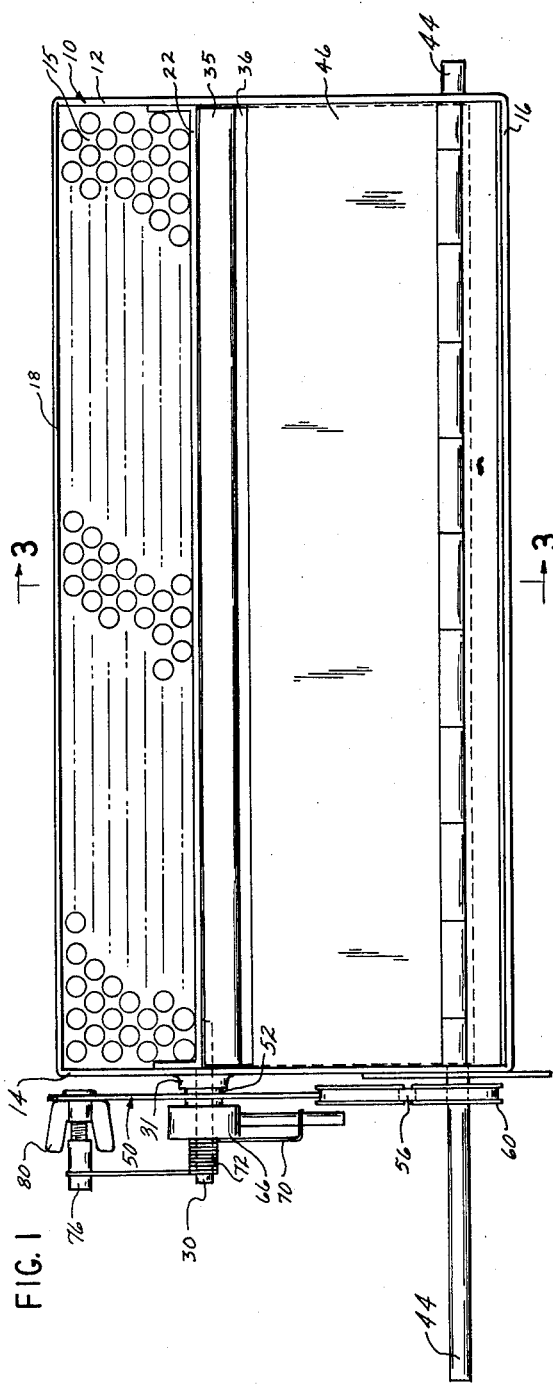
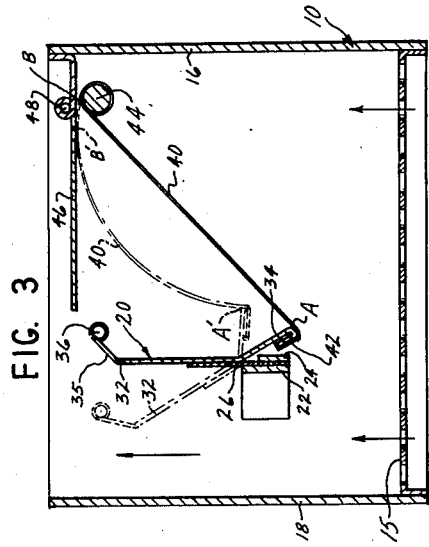
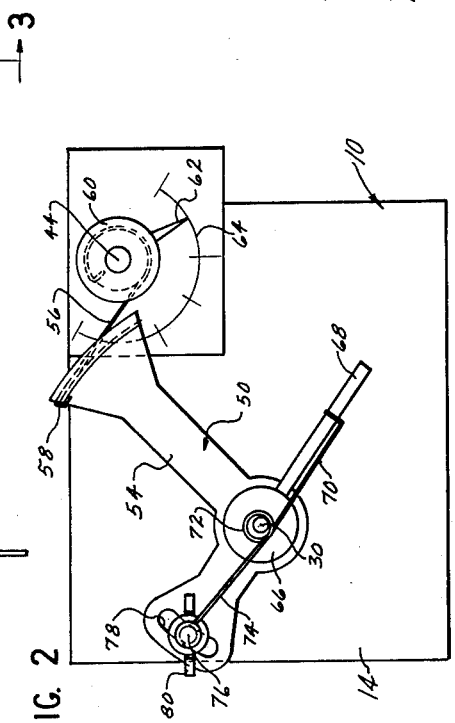
*INVENTORS*
ALBERT S. EDWARDS
ERNEST H. PERSON
BY *Lindsey, Critzman and Hayes*
ATTORNEYS June 29, 1965  A. S. EDWARDS ETAL  3,191,615
AUTOMATIC FLUID CONTROLLER
Filed June 9, 1961  2 Sheets-Sheet 2

INVENTORS
ALBERT S. EDWARDS
ERNEST H. PERSON
BY
*Lindsey, Prutzman and Hayes*
ATTORNEYS

United States Patent Office 3,191,615
Patented June 29, 1965

3,191,615
AUTOMATIC FLUID CONTROLLER
Albert S. Edwards, Agawam, Mass., and Ernest H. Person, New Britain, Conn., assignors to Allied Thermal Corporation, New Britain, Conn., a corporation of Connecticut
Filed June 9, 1961, Ser. No. 116,196
14 Claims. (Cl. 137—499)

This invention relates to fluid controllers and more particularly to a fluid controller having an automatic adjustment for maintaining a constant volumetric flow. While not limited thereto, the fluid controller of the present invention has particular utility for use in air distribution systems employed for heating and ventilating buildings.

In air distribution systems it is conventional to have a plurality of outlets connected to an air source with a single conduit, and it is a normal occurrence for the total pressure head within the conduit to vary as the ventilation requirements of the various outlets change. Additionally, many air distribution systems have hot air and cold air inlets and a mixing valve for controlling the proportions of hot and cold air discharged, and as the mixing valve regulates these proportions, there is a resultant change in the total pressure head downstream of the mixing valve. In both of these air distribution systems, if the outlet fluid controller has a fixed position, there would not be a constant volumetric flow therethrough but such flow would change as the total pressure head upstream of the controller changes.

It is an aim of this invention to provide a fluid controller that automatically maintains a constant volumetric flow notwithstanding a change in the velocity or static head upstream of the damper.

It is another object of this invention to provide a fluid controller that is adjustable within its designed flow range to an infinite number of constant fluid flow positions.

A still further object of this invention is to provide an improved automatic constant volume fluid controller that has a minimum number of parts and which is simple in construction and dependable in operation.

Another object of this invention is to provide an improved fluid controller that automatically restricts the fluid outlet upon an increase in fluid velocity.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 5:
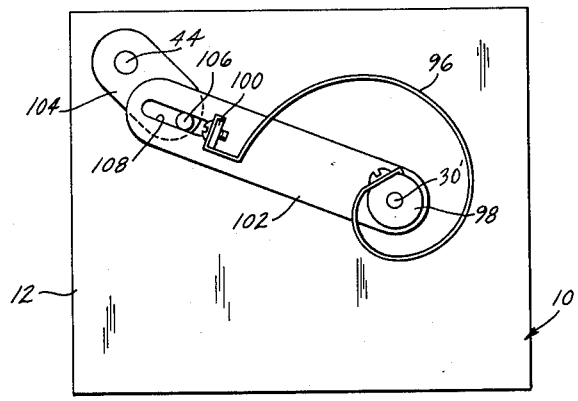

In the drawings:
FIG. 1 is a plan view of an embodiment of a fluid controller of this invention;
FIG. 2 is a left end view of the controller of FIG. 1;
FIG. 3 is a cross sectional view taken substantially along the 3—3 of FIG. 1;
FIG. 4 is a left end view of a modified fluid controller; and
FIG. 5 is a right end view of the modified fluid controller of FIG. 4.

The controller of this invention is shown in the drawings installed in a rectangularly shaped conduit 10 having side walls 12, 14, 16, 18. A fluid which is to be controlled passes through the ends of the conduit, as shown by the arrows in FIG. 3, and is maintained at a substantially constant pressure across the conduit inlet by an apertured sheet metal plate 15. Pivotally mounted within the conduit 10 is a damper blade 20 having an elongated pivotal axis formed by an elongated bracket or rib 22, a plate 24 and a flexible web hinge 26. The bracket 22 is fastened to and extends between the side walls 12 and 14, the web 26 is clamped along one edge portion to the bracket 22 by the plate 24, and the other edge portion of the web 26 is cemented or otherwise fastened to one surface of the damper blade 20 to form a web hinge. Coaxial with the damper axis and fixed to the damper blade 20 is a shaft 30 that is freely rotatable within the boss 31 on the side wall 14.

The damper blade 20 has an upstream portion 34 and a downstream portion 32 with an angularly related end portion 35 terminating in a rolled edge 36 that is adapted to sealingly engage the wall 18 and thereby shut off fluid flow when the damper blade 20 is pivoted counterclockwise, as viewed in FIG. 3, to fully closed position. Of course, the damper blade may take any one of an infinite number of intermediate positions such as the dotted line position shown in FIG. 3 between the closed position and the full open position shown in solid lines in FIG. 3.

A blanket motor 40 is provided for operating the damper blade and comprises a web or sheet of flexible material having one end 42 secured along the upstream longitudinal edge of the damper blade and the opposite end secured to a blanket shaft 44. The shaft 44 is rotatably mounted in the conduit side walls 12 and 14 and is adjustable to increase or decrease the length of the blanket motor 40 extending between the shaft 44 and the damper blade end 34. The blanket 40 is flexible and preferably is fabricated of nonporous material, such as neoprene or the like, and assumes a partially cylindrical shape, as shown in phantom in FIG. 3, as the fluid passing through the conduit 10 creates a differential pressure thereon. A blanket stop 46, shown as an elongated flat sheet metal plate, is pivotally mounted about a longitudinal axis 48 that is parallel to and adjacent the shaft 44. As the blanket motor 40 bellows out due to the force created by the fluid flowing through the conduit, a portion of the blanket engages the blanket stop 46 (as shown in phantom in FIG. 3) and conforms to the surface thereof. By either pivoting the stop 46 or by constructing the stop differently from the plane shape shown, an optimum rate of engagement by the blanket with the stop can be obtained, as determined experimentally for each controller configuration.

Referring to FIGS. 1 and 2, one embodiment of an adjustment mechanism for the damper blade includes a bell crank 50 that is pivotally mounted on a reduced portion 52 of the boss 31. One arm 54 of the bell crank 50 has a curved end surface forming an arc of a circle, and a flexible band 56 having an end 58 secured to the arm 54 operates to transfer motion to the bell crank from a spool 60 fixed to the shaft 44. The shaft 44 also supports a pointer 62 that cooperates wtih a calibrated scale 64 mounted upon the side 14 of the conduit. It can be seen that as the shaft 44 is rotated, the pointer 62 moves along the scale 64 and the bell crank 50 is oscillated about its axis.

A bushing 66 is fixed to the shaft 30 and supports a radially extending arm 68 that is biased in the clockwise direction, as shown in FIG. 2, by one arm 70 of a helical spring 72. The helical spring 72 is loosely supported on the shaft 30 and has a second arm 74 engaging a pin 76. The pin 76 is threaded at one end and is adjustable within the slot 78 by means of the wing nut 80 for providing an adjustable bias upon the damper blade 20. The blanket motor 40 and the spring bias are thereafter simultaneously adjusted by rotating the shaft 44, and for any given position of the bell crank 50, a non-biased or non-flow position of the damper blade 20 is established. Since the pointer 62 is an indicator for these adjustments, the scale 64 can be calibrated according to the particular configuration to represent the volumetric flow established.

Another embodiment of an adjustment mechanism for the damper blade is shown in FIGS. 4 and 5. In this embodiment the pointer 90 is fixed to the blanket shaft 44 adjacent to the side wall 14 and is adapted, as in the first described embodiment, to be rotated to adjust the length of the blanket between the shaft 44 and the damper blade for adjusting the volumetric flow to that indicated by the calibrated scale 92. The pointer 90 can be secured in any adjusted position by a clamping means (not shown) that is operated by the wing nut 94. A damper opening or counterclockwise bias (as viewed in FIG. 5) on the damper blade is brought about by an involute shaped spring 96 having one end secured to a collar 98 that is fixed to a damper blade shaft 30' extending through the side wall 12, and having its other end secured to an upstanding lug 100 on the lever 102 that is rotatably mounted on the shaft 30'. In order to vary this damper opening bias in conjunction with an adjustment of the length of the blanket, the lever 102 is pivoted by a second lever 104 that is fixed to the blanket shaft 44 and which supports a pin 106 that is slideably received within an elongated slot 108 in the lever 102. Consequently, when the length of the blanket 40 between the blanket shaft 44 and the damper blade 20 is increased for increasing the volumetric flow, the opening bias on the damper blade is increased.

For reducing oscillation of the damper blade, a damping cylinder and piston assembly 110 (FIG. 4) is pivotally mounted at 112 upon the conduit side wall 14 and is connected to the damper blade by the piston rod 114 and a lever 116 that is pivotally connected thereto and which is fixed upon the shaft 30. As the damping piston is dimensioned to allow a limited amount of air to pass around its perimeter, it acts to dampen the damper blade oscillation.

To complete the understanding of the fluid controller of this invention, reference will now be made to the physical relationships upon which it is based. The volumetric flow through the controller, as is well known, will vary directly with the product of the area of the opening through which the fluid passes and the velocity of the fluid flowing therethrough; or, with the product of the area and the square root of the velocity pressure head. In a conventional fluid controller utilizing a single pivoted damper blade, the velocity head acting directly upon the damper blade creates a moment on the damper that is proportional to the velocity head. It is, therefore, necessary to have a return spring that creates a moment on the damper blade which has a logarithmic relationship with the spring deflection, rather than a linear relationship, if a constant volumetric flow is to be obtained. This is because the volumetric flow on the one hand is proportional to the velocity, whereas the moment on the damper created by the velocity head is proportional to the square of the velocity. For example, if the velocity were doubled, it would be necessary to reduce the fluid opening by one-half to maintain a constant volumetric flow; however, the closing moment on the damper brought about by the increased velocity head would be quadrupled. Consequently, the spring force operating against the velocity head moment would necessarily have to quadruple with a damper deflection that is twice the original deflection. A spring creating a moment having a logarithmic or non-linear relationship with its deflection would, therefore, have to be used and would then only be usable with a fluid damper having a single non-adjustable constant flow rate.

In the embodiments of this invention shown in the drawings, it will be seen that the moments on the damper blade created by the velocity head depend upon the areas of the blade portions 32, 34, and 35 and the moment created by the velocity head of the fluid acting upon the blanket motor 40. The moments upon the damper blade are approximately proportional to the square root of the velocity head so that a spring utilizing a linear spring rate can be associated with the damper blade to maintain a preset but adjustable constant volumetric flow.

Since velocity pressure head changes according to the square of the velocity, the effective area upon which the velocity pressure acts and/or the effective lever arm of the force created thereby can be changed to make the total moments on the damper blade directely proportional to the square root of the velocity head or directly proportional to the velocity.

The effective areas and effective lever arms of the portions 32, 34, 35 of the damper blade remain substantially constant with a change in velocity of the fluid or the position of the damper. However, the total velocity head moment on the damper blade may be changed by changing the effective lever arm and/or the effective area of the motor blanket 40. The effective area of the motor blanket is defined as being the projected area of the blanket on a plane through a first line where the blanket is connected to the damper blade and a second line where the blanket engages the blanket stop 46, or where the blanket is tangent to the shaft 44, whichever is closer to the first line. As shown in FIG. 3, the effective area of the blanket shown in the solid line would be the product of the distance between the points A and B and the longitudinal length of the blanket, such latter length remaining constant in any given configuration. The effective area of the blanket in phantom is the product of the longitudinal length of the blanket and the distance between points A' and B', such effective area being obviously less than that of the blanket shown by the solid line.

The effective lever arm of the force on the blanket motor is defined as the product of the distance between the pivotal axis of the damper blade and the center of gravity of the effective area and the cosine of the angle formed between the plane of the effective area and a line connecting the damper blade axis and the center of gravity of the effective area. The moment created by the differential pressure acting on the blanket is then the product of the differential pressure, the effective area and the effective lever arm.

The blanket motor 40 for any given position of the shaft 44 will take a partially cylindrical shape, and with an increase in the velocity head and movement of the damper blade 20 in the closing direction, the effective lever arm and the effective area of the blanket motor 40 will vary. Additionally, as the motor blanket takes an arcuate shape, a portion of the blanket adjacent the shaft 44 engages the blanket stop 46 to thereby reduce the effective area of the blanket 40.

By experimentally adjusting the configuration of the blanket stop 46 and the length of the blanket motor 40 between the blanket shaft 44 and the damper blade, a substantially linear relationship between the total closing moment on the damper blade and the fluid velocity (or the square root of the velocity head) can be obtained. Therefore, a spring 72 or 96 having a linear relationship between deflection and moment can be used to maintain a constant volumetric flow.

The variables determinative of the relationship between the blanket motor moment and the velocity of the fluid include the length of the blanket between the blanket shaft and the damper blade, the position of the blanket shaft relative to the damper pivot axis, the position of the damper blade end of the blanket relative to the damper blade pivot, and the position and shape of the blanket stop 46. These variables can be changed to adapt the principles of this invention to the particular installation. The embodiments shown and described here have been tested and are accurate with ±5% in maintaining a constant volume flow, using air as the fluid medium and with a variation in the static pressure head of eight inches of water.

The length of the blanket motor 40 and the initial or non-bias position of the damper blade is adjustable to preset the damper for a constant volumetric flow within a range between zero flow and a maximum obtainable flow, for any specific construction. If desirable, although only a single damper unit is shown and described, a plurality of these units could be combined in parallel for a single outlet.

As will be apparent to persons skilled in the art, various modifications and adaptations of the structure above described will become readily apparent without departure from the spirit and scope of the invention, the scope of which is defined in the appended claims.

We claim:

1. In a fluid distribution system a fluid controller, comprising; a housing for connection in the system, a damper interposed in said housing, said damper being pivotally mounted to move in opening and closing directions, a flexible blanket having one end attached to and supported by said damper at a point spaced from the damper pivot and positioned in the path of flow of the fluid, said blanket having the other end supported by the housing and spaced from said one end whereby the fluid creates a force on said blanket bringing about a moment on the damper in one of said directions, and means for varying the moment force of said blanket.

2. In a fluid distribution system, a fluid controller, comprising; a fluid conduit, a damper pivotally mounted in said conduit, said damper being adapted to swing in opening and closing directions to control the volumetric flow through the conduit, means biasing the damper in one of said directions, web means having one end secured to said damper at a point on said damper spaced from the damper pivot and a fixed other end spaced from said one end, said web being flexible and positioned for contact with the fluid flowing in the conduit, and a web stop positioned adjacent one part of said web on the downstream side thereof, said stop having a surface adapted to be engaged by the web during movement of the damper in the other of said directions whereby the moment on the damper created by the fluid pressure on the web is reduced with movement of the damper in the said other direction.

3. In a fluid distribution system, a fluid controller, comprising; a conduit connected to the distribution system, a damper blade pivotally mounted in the conduit and being adapted to vary the volume of fluid flowing through the conduit upon movement of said damper about its pivot in opening and closing directions, a flexible blanket having one end fixed to said damper blade at a point spaced from the damper blade pivot and another fixed end spaced from said damper, said blanket being positioned in the conduit and adapted to have a differential pressure created by the fluid flow acting thereon, said blanket due to the differential pressure acting thereon creating a moment on the damper blade in a closing direction, and adjustment means adapted to vary the effective area of the blanket upon which the differential pressure acts to adjust the moment on the damper in the closing direction.

4. In a fluid distribution system having an outlet conduit, a fluid controller comprising; a damper blade pivotally mounted in the conduit and adapted to swing about its pivot between a less fluid restricting position and a more fluid restricting position, said damper blade having one portion adapted to restrict the said fluid flow and a second portion extending on the opposite side of said pivot, a flexible blanket having one end fixed to said second portion at a point spaced from said pivot and a second fixed end spaced therefrom, a spring operably connected to the damper blade and biasing it in a less fluid restricting direction, said blanket being positioned to have a differential pressure acting thereon created by the fluid passing through the conduit, and a backing plate positioned adjacent said blanket on the low pressure side thereof and adapted to be engaged by the said flexible blanket and thereby reduce the effective area of the blanket upon which the fluid pressure acts as the damper moves in the more fluid restricting direction.

5. In a fluid distribution system having an outlet conduit, a fluid controller comprising; a fluid damper pivotally mounted in the outlet conduit and movable in a less fluid restricting direction and a more fluid restricting direction, spring means biasing said damper in the less fluid restricting direction, a flexible blanket having one end fixed to the damper at a point spaced from the damper pivot and another end fixed to a rotatably mounted shaft, said blanket being positioned to be acted upon by a differential pressure substantially equal to the velocity head of fluid flowing through the conduit and to bias the damper in a more fluid restricting direction, said blanket having an effective area upon which the fluid pressure differential acts to create the bias on the damper, means decreasing the effective area as the damper moves in a more fluid restricting direction at a rate such that the bias in the more fluid restricting direction is approximately directly proportional to the velocity of the fluid in the said conduit, manual adjustment means adapted for moving the shaft about its axis to vary the length of said blanket between the shaft and the damper, and means operably connected to the manual adjustment means adjusting the damper bias of said spring means.

6. In a fluid distribution system, a fluid controller comprising; a fluid outlet conduit connected to the distribution system and defining an enclosed passageway, a damper blade pivotally mounted in said outlet conduit across the passageway and adapted to move between a closed position substantially closing at least a portion of said passageway and an open position allowing fluid flow therethrough, a shaft rotatably mounted in said conduit and having its axis parallel to the pivotal axis of said damper, a flexible blanket having one end fixed to said shaft and its other end fixed to said damper blade along a line spaced from the pivot axis of said damper blade, said blanket extending substantially across that portion of the passageway between the said shaft and the damper blade, and a stop plate pivotally mounted on an axis parallel to the axis of said shaft and adjacent to said shaft, said stop plate positioned downstream of the blanket and adapted to be engaged by the blanket as the damper blade moves in the closing direction, and manual adjustment means for rotatably positioning the shaft.

7. In a fluid distribution system, a fluid controller comprising; a fluid outlet conduit connected to the fluid distribution system and defining a passageway therethrough, said conduit being of substantially rectangular cross section and with opposed parallel sides, a damper blade pivotally mounted in said conduit on an axis extending between a first two of said parallel sides, a first shaft fixed to said damper blade and coaxial therewith and extending through one of the first two parallel sides, said damper blade having a downstream portion and upstream portion, said downstream portion being adapted to engage a third side of the conduit to close off fluid flow through the said passageway, a second shaft rotatably mounted between the first two parallel sides and having an axis parallel to the axis of the damper blade and positioned adjacent a fourth of said sides parallel to and opposite the third side, a flexible blanket having a first end connected to the upstream portion of the damper blade along a line parallel to but spaced from the damper blade axis and another end fixed to the second shaft, said flexible blanket extending substantially between the first two parallel sides, a lever pivotally mounted on the said one of the first parallel sides coaxial with the damper blade, a coil spring loosely mounted on said first shaft and having one end adapted to bias the damper in the opening direction and another end engaging a pin on said lever, and manually adjustable means for simultaneously pivoting said lever and moving said second shaft about its axis, whereby the length of the blanket between the second shaft and the damper blade and the bias by the spring on the damper blade may be simultaneously varied.

8. In a fluid distribution system, a fluid controller comprising; a fluid conduit adapted for connection to the distribution system and having a fluid passageway therethrough, a damper blade pivotally mounted within the conduit across the passageway for movement in opening and closing directions, a shaft rotatably mounted on said conduit and having its axis parallel to the pivotal axis of the damper blade, a flexible blanket having one end fixed to the shaft and its opposite end operably connected to the damper blade, a first lever fixed to the shaft for rotatable movement therewith, a second lever pivotally mounted upon the conduit, a spring having a first end fixed to the second lever and a second end fixed to the damper blade creating a pivotal bias upon the damper blade that varies with the pivotal position of the second lever, and means operably connecting the first and second levers and translating pivotal movement of one of the levers into pivotal movement of the other of said levers.

9. In a fluid distribution system having at least one outlet conduit, a fluid controlled in the conduit comprising, a damper blade in the conduit, means mounting the damper blade for pivotal movement about an axis passing through the damper blade in response to a pressure differential across the damper blade to vary fluid flow through the conduit, a flexible blanket positioned in the conduit having one end connected to the damper blade at a point spaced from the damper blade pivot and having the other end supported by the housing, said blanket being in the path of fluid flow whereby fluid acting on the blanket will cause the blanket to exert a biasing force tending to pivot the damper blade in one direction, and means associated with the blanket for automatically varying the biasing force of the blanket acting on the damper blade.

10. A fluid controller for maintaining a constant preselected volumetric flow comprising, a housing having a conduit therethrough, a damper mounted in the conduit to move in one direction to increase the flow area of the conduit and in an opposite direction to decrease the flow area of the conduit, means for positioning the damper so as to maintain a constant volume of flow through the conduit including a flexible blanket having one end secured to the housing and the other end connected to the damper, said blanket being positioned in the conduit in the path of fluid flow whereby fluid acting on the blanket causes the blanket to urge the damper towards one of said directions, and manual adjusting means for varying the length of the blanket exposed to the fluid in the conduit for preselecting the volumetric flow of fluid to be maintained in the conduit.

11. In a fluid distribution system having at least one outlet conduit, a fluid controller in the conduit comprising, a damper blade movable in opening and closing directions to vary the fluid flow through the conduit, means biasing the damper blade in one of said directions, a damper motor including a flexible sheet positioned to have a differential pressure on opposite sides thereof creating a force that varies with the fluid flow through the conduit, connecting means operably connecting the flexible sheet to the damper blade and biasing the damper blade in the other of said directions with a force that varies with the differential pressure on the flexible sheet whereby the damper blade has a position determinative by said biasing means and said differential pressure, said flexible sheet having an effective area upon which the differential pressure acts and an effective lever arm through which the differential pressure acts to bias the damper blade in said other direction, the bias of said connecting means on the damper blade being proportional to the product of the effective area and the effective lever arm, said flexible sheet being positioned so that said effective area changes with the movement of the damper blade, and a stop member positioned adjacent the flexible sheet on the low pressure side thereof, said stop member being positioned for engagement by the flexible sheet upon movement of the damper blade in said other direction, whereby the effective area of the flexible sheet is reduced upon an increase of the differential pressure and resulting movement of the damper blade in said other direction.

12. In a fluid control device adapted for controlling the fluid flow through a conduit, having a damper in the conduit operable in more restricting and less restricting directions to vary the fluid flow through the conduit and damper operating means for automatically positioning the damper within the conduit, the improvement wherein the damper operating means comprises a flexible blanket portion extending within the conduit transversely of the direction of flow therein for sensitivity to a pressure differential thereacross which varies with the velocity of the fluid flowing through the conduit, said blanket portion having a pair of opposed ends, means for mounting one of said ends within the conduit in a spaced relationship with the other of said ends allowing the flexible blanket portion to balloon downstream under the force of the differential pressure, and means operably connecting said other end of the blanket portion with the damper for biasing the damper in one of said directions with a force which varies with the differential pressure on the blanket portion and with the position of the damper in the conduit.

13. In a fluid control device adapted for controlling the fluid flow through a conduit, having a damper in the conduit operable in more restricting and less restricting directions to vary the fluid flow through the conduit and damper operating means for automatically positioning the damper within the conduit, the improvement wherein the damper operating means comprises a flexible blanket portion extending within the conduit transversely of the direction of flow therein for sensitivity to a pressure differential thereacross which varies with the velocity of the fluid flowing through the conduit, said blanket portion having a pair of opposed ends, means for mounting one of said ends within the conduit in a spaced relationship with the other of said ends allowing the flexible blanket portion to balloon downstream under the force of the differential pressure, means operably connecting said other end of the blanket portion with the damper for biasing the damper in one of said directions with a force resulting from the differential pressure on the blanket portion, and control means adapted to vary the effective area of the blanket portion upon which the differential pressure acts and thereby vary the force on the damper resulting from the differential pressure.

14. The improvement of claim 13 wherein the control means comprises a stop plate on the low pressure side of the blanket portion engageable by the blanket portion to reduce the effective area thereof.

References Cited by the Examiner
UNITED STATES PATENTS

| | | | |
|---|---|---|---|
| 571,658 | 11/96 | Graves | 137—499 |
| 1,346,887 | 7/20 | Heald | 137—54 XR |
| 2,263,980 | 11/41 | Carlson | 137—521 |
| 2,749,833 | 6/56 | Kekelaar | 137—499 XR |
| 2,787,288 | 4/57 | Shataloff et al. | 137—520 XR |
| 2,888,948 | 6/59 | Pellmyr | 137—501 |

M. CARY NELSON, *Primary Examiner.*

ISADOR WEIL, MARTIN P. SCHWADRON,
*Examiners.*